Aug. 15, 1939.　　　M. E. LANGE　　　2,169,767
MACHINE TOOL
Filed July 1, 1937　　　8 Sheets-Sheet 1
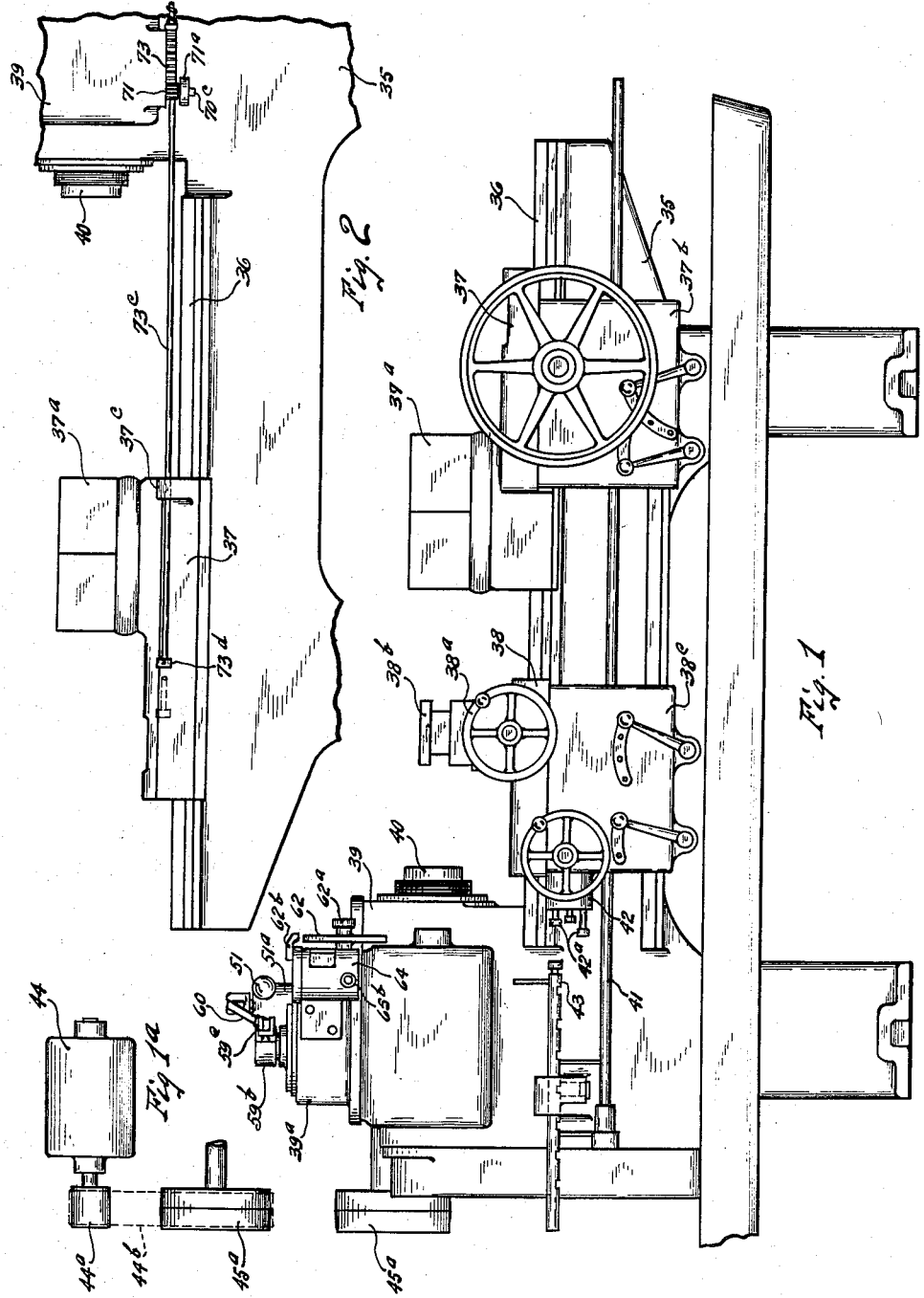
INVENTOR.
MAX E. LANGE
BY
Kwis Hudson & Kent
ATTORNEYS

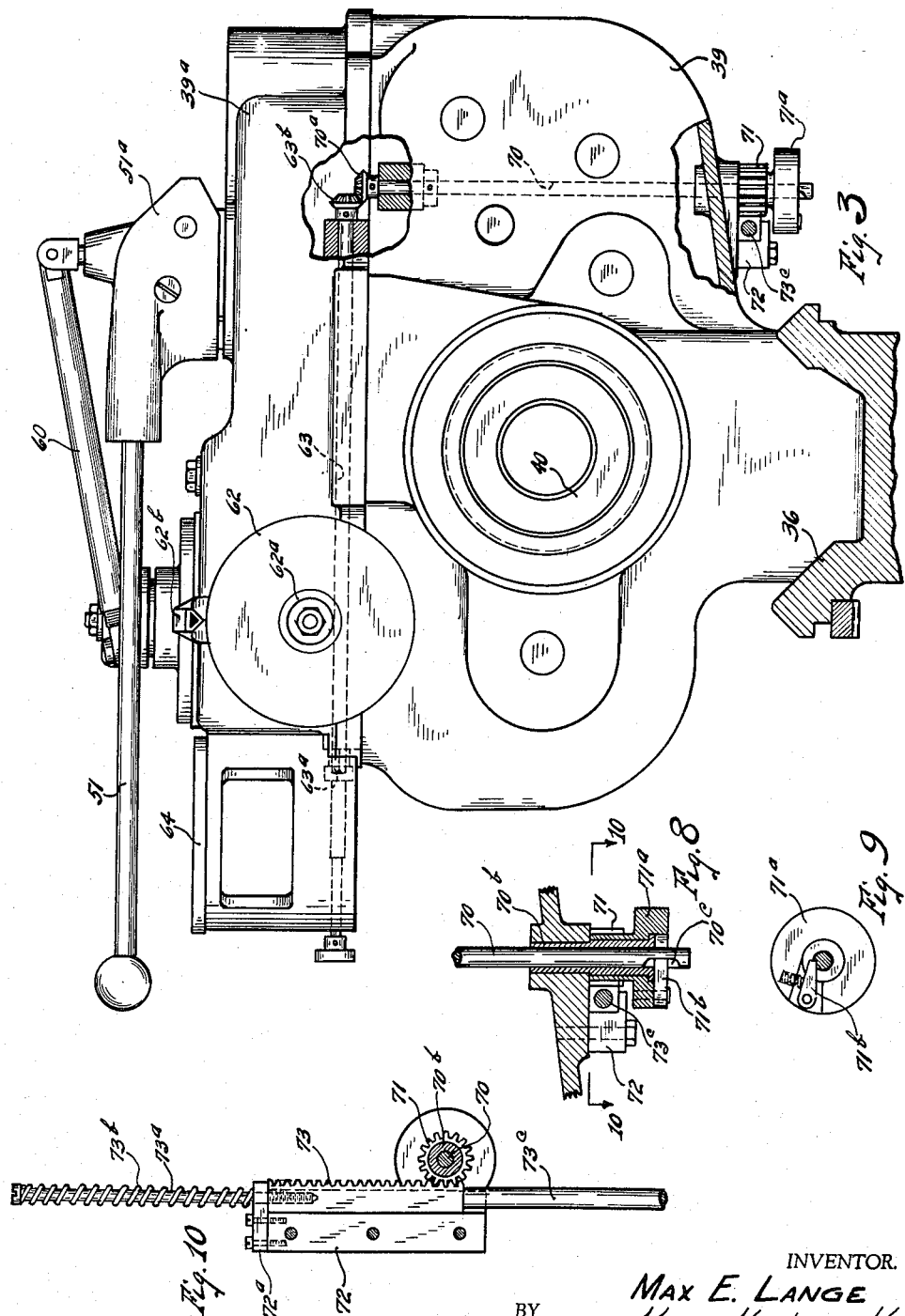

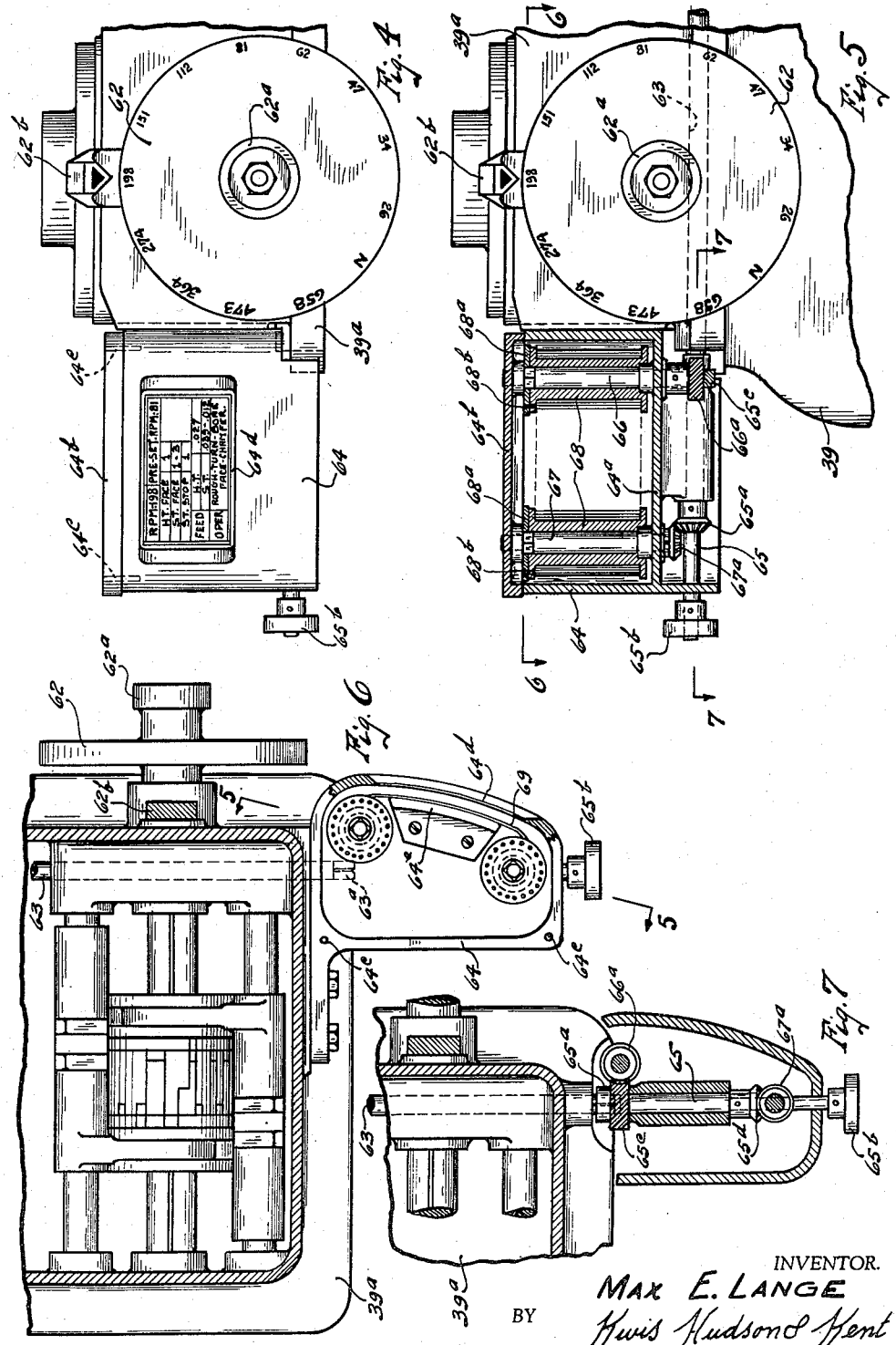

Aug. 15, 1939.    M. E. LANGE    2,169,767
MACHINE TOOL
Filed July 1, 1937    8 Sheets-Sheet 4
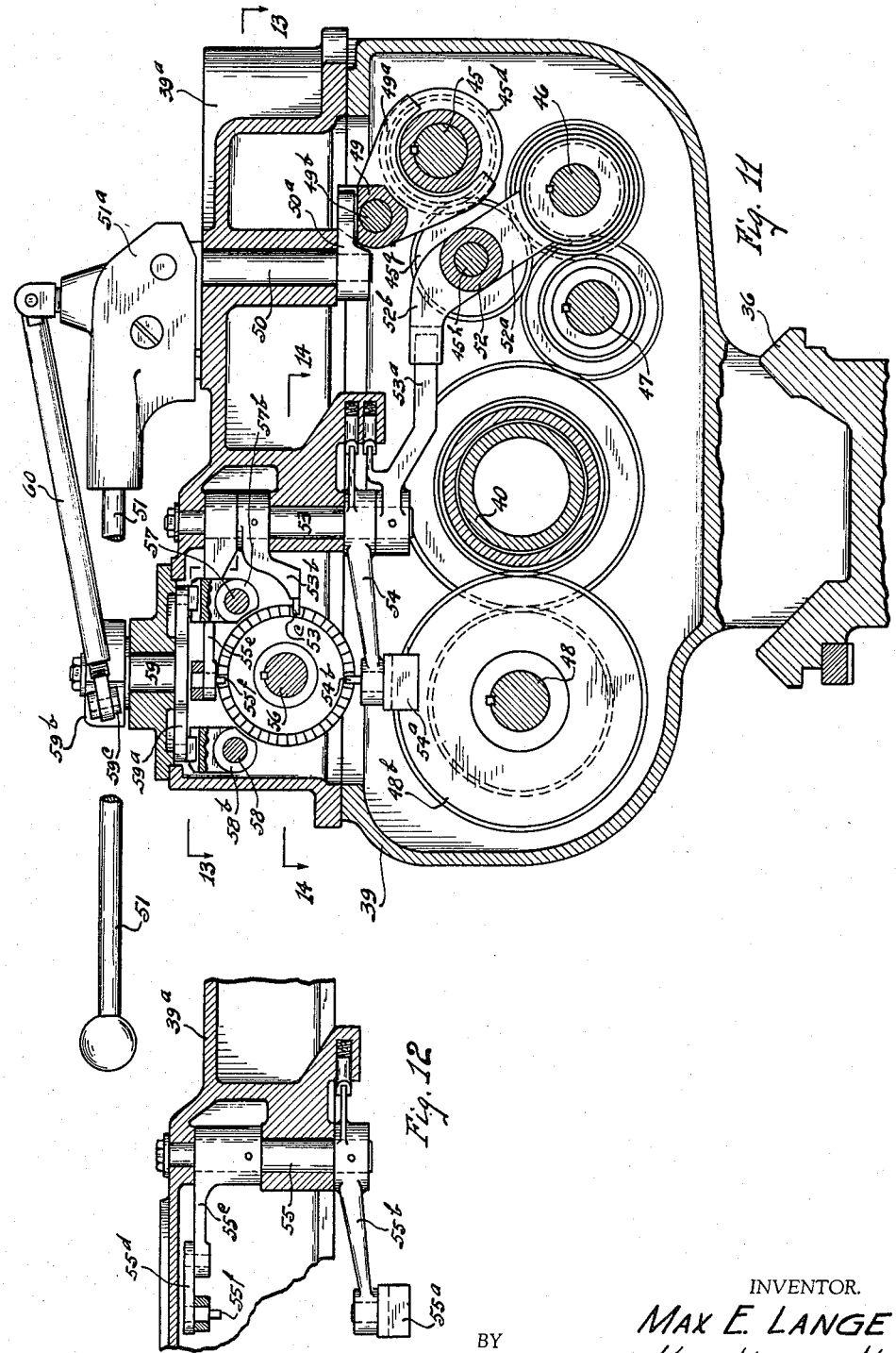
INVENTOR.
MAX E. LANGE
BY Kwis Hudson & Kent
ATTORNEYS Aug. 15, 1939.　　　M. E. LANGE　　　2,169,767
MACHINE TOOL
Filed July 1, 1937　　　8 Sheets-Sheet 5
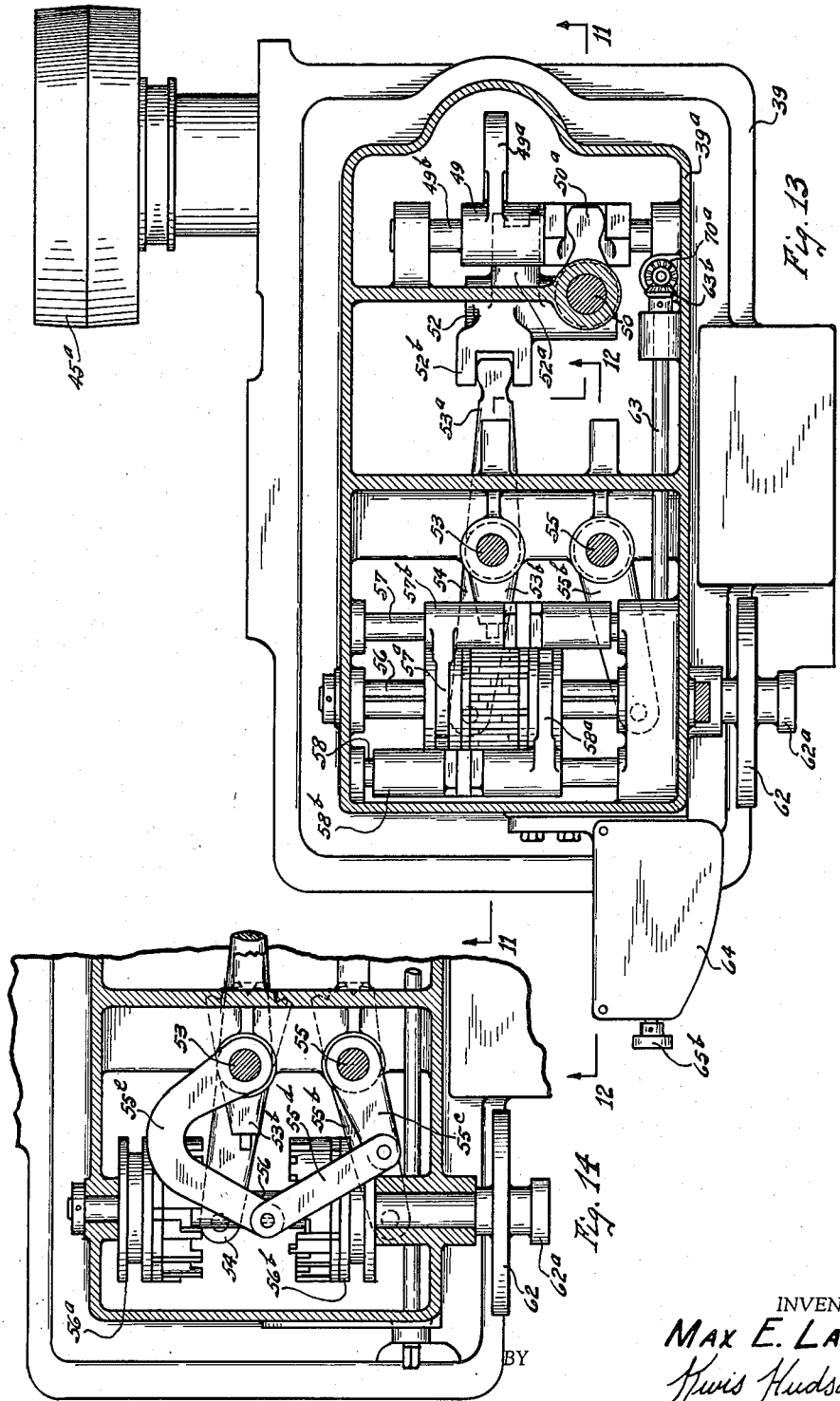
INVENTOR.
MAX E. LANGE
BY Kuris Hudson & Kent
ATTORNEYS Aug. 15, 1939. M. E. LANGE 2,169,767
MACHINE TOOL
Filed July 1, 1937 8 Sheets-Sheet 6
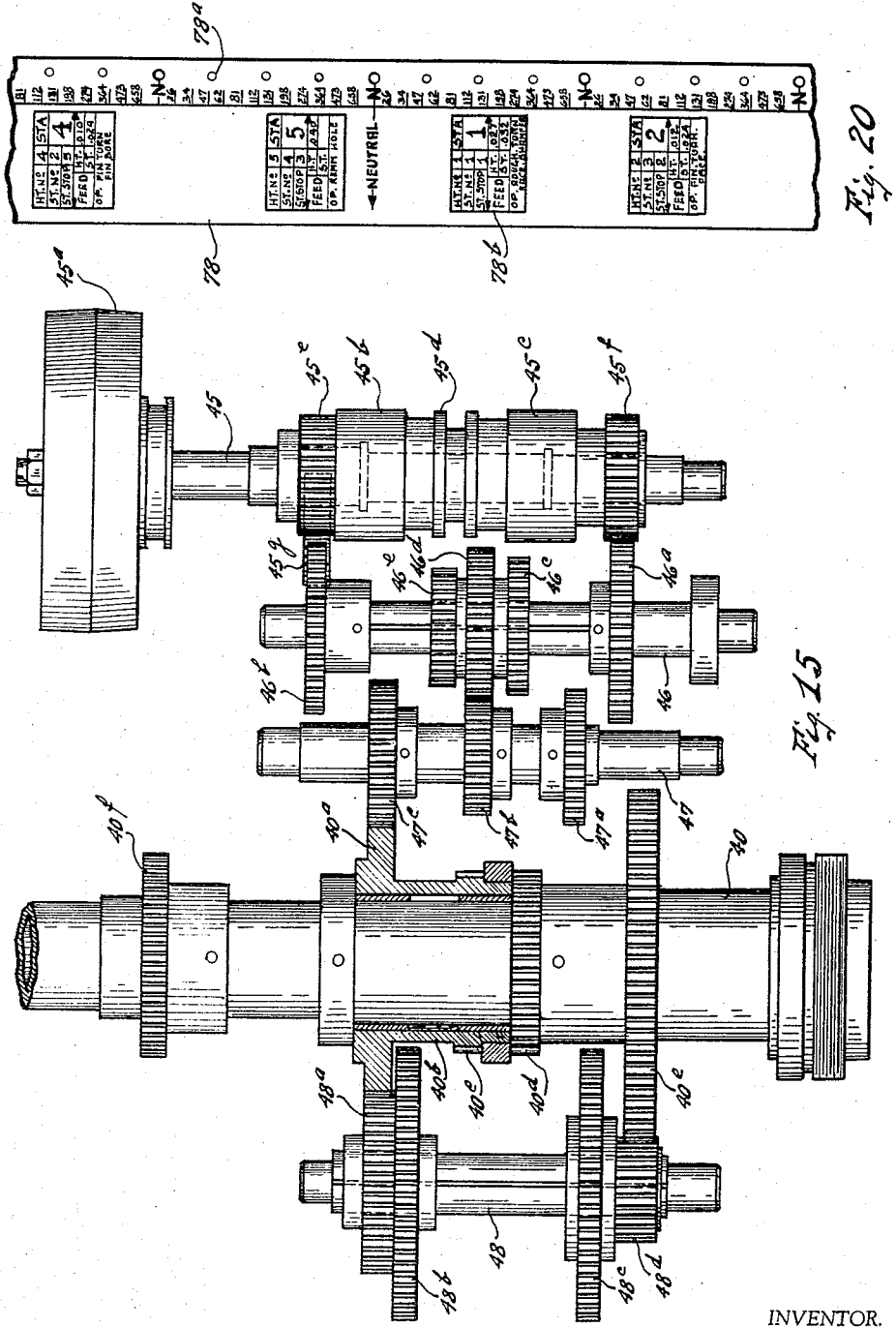
INVENTOR.
MAX E. LANGE
BY
Kwis Hudson & Kent
ATTORNEYS

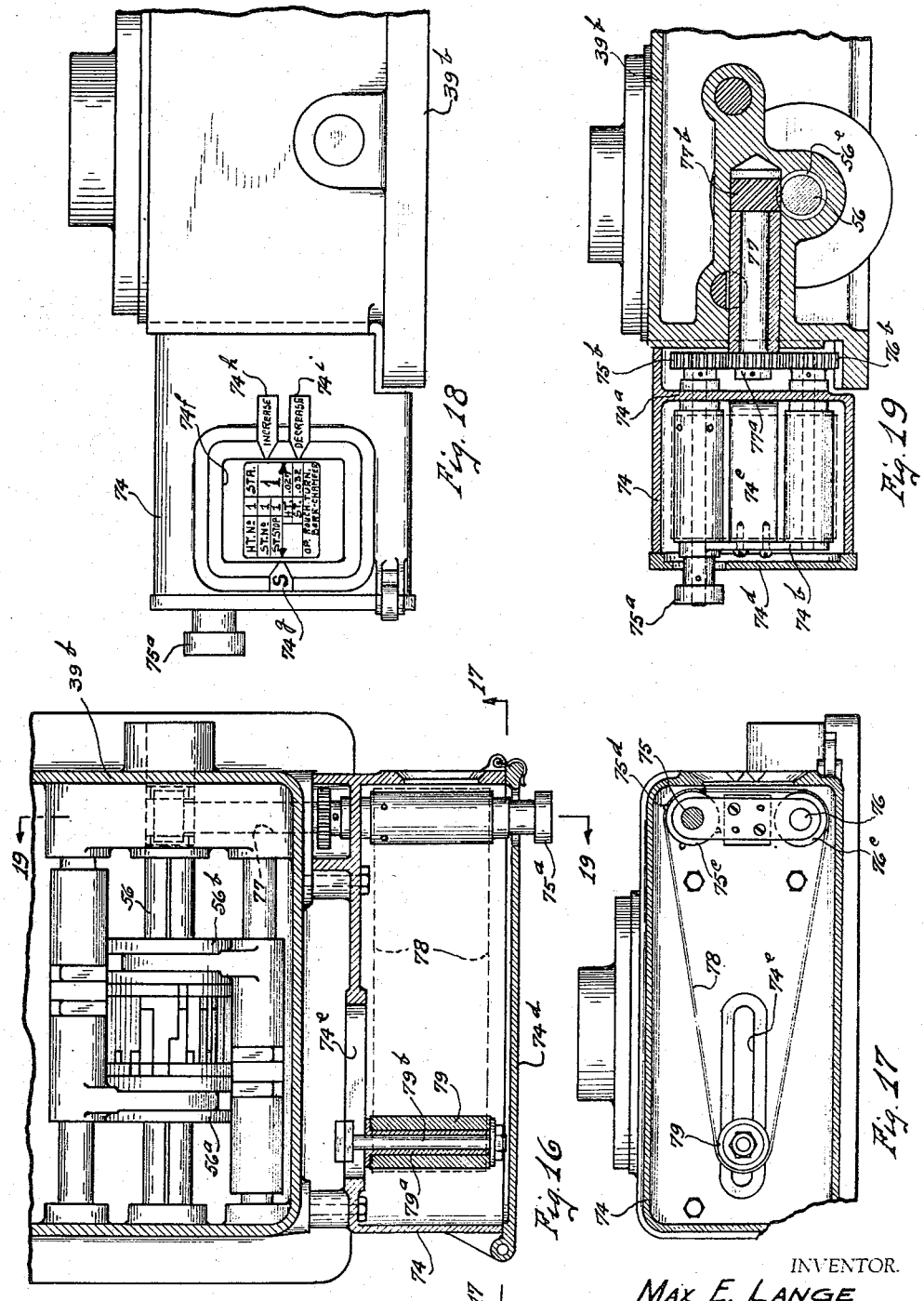

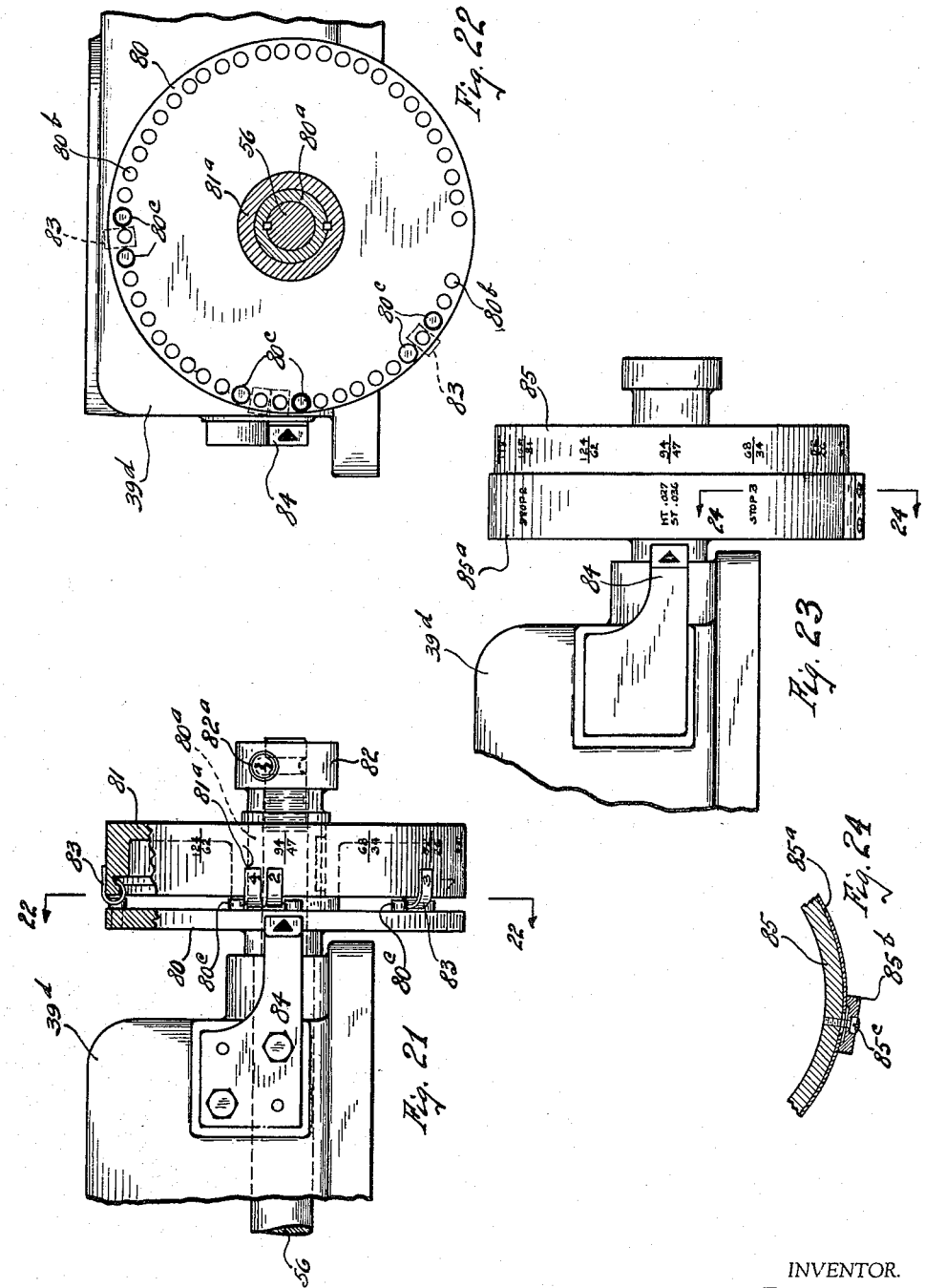

Patented Aug. 15, 1939

2,169,767

UNITED STATES PATENT OFFICE 2,169,767

MACHINE TOOL

Max E. Lange, Cleveland Heights, Ohio, assignor to The Warner & Swasey Company, Cleveland, Ohio, a corporation of Ohio Application July 1, 1937, Serial No. 151,379
In Great Britain March 23, 1936

13 Claims. (Cl. 82—29)

This invention relates to a machine tool of the type having one or more movable members to be operated at varying speeds and/or rates of feed.

Heretofore it has been customary shop practice to furnish the operator of a machine tool with an instruction sheet or drawing giving the necessary information to enable the operator to produce a work piece upon the machine, such information including for example the different spindle speeds, rates of feed, limit stops for positioning the moving parts, turret settings and the like to be used in the different sequential operative steps in the complete operative cycle for the production of the work piece, as well as the character of the work to be performed, such as turning, facing, boring, reaming, tapping, chamfering, and the like. These instruction sheets or drawings are not only apt to be misplaced and may become illegible through accumulating grease and dirt thereon, but, since they contain the necessary information for each step in the complete operative cycle, they are often bulky and confusing to the operator, causing him to proceed slowly, thus resulting in an inefficient operation of the machine.

An object of the present invention is to provide in a machine tool means which is incorporated into the machine as a part thereof, and which visually indicates to the operator the information necessary for him to operate the machine in the different sequential steps of the operative cycle for the production of a work piece, thus increasing the operating efficiency of the machine.

Another object of the invention is to provide in a machine tool means for visually indicating sequentially to the operator the information pertaining to the operation of the machine for the different steps in the complete operative cycle, which means is movable and has an operative relation to the speed changing mechanism of a movable part of the machine, such that when said means is moved to disclose the information relative to the next operative step in the cycle, the required speed for said part in the next step is automatically preselected.

Another object is to provide in a machine tool movable means for controlling the speed of operation of a movable part of the machine for the different steps in the operative cycle and which means is provided with members visually representing the different operative steps in the complete cycle and indicating the various positions to which said means should be moved in said different operative steps.

Another object is to provide in a machine tool movable means for visually indicating to the operator information necessary for the operation of the machine for the production of a work piece and including members showing the different positions to which said means should be moved for the different operative steps in the complete cycle, together with provision for locking said members in the proper position upon said means, wherefore the operator cannot alter the positions of said members.

Another object is to provide in a machine tool means movable to control the speed of operation of a movable part of the machine, which means bears indicia indicating the positions it should be moved to to obtain the different changes in speed for said part, together with adjustable members positioned on said means and cooperating with the indicia thereon for indicating the various operative steps in the complete cycle which are to employ the different speeds of operation for said movable part of the machine.

Further and additional objects and advantages will become apparent hereinafter during the following detailed description of several embodiments of the invention, which embodiments are illustrated in the accompanying drawings and, by way of example, are shown as applied to a turret lathe.

In the accompanying sheets of drawings,

Fig. 1 is a front elevational view of a turret lathe embodying one form of the present invention;

Fig. 1ª is a fragmentary view on a reduced scale showing the motor drive;

Fig. 2 is a fragmentary rear elevational view of the lathe shown in Fig. 1;

Fig. 3 is an end elevational view of the head stock of the lathe shown in Fig. 1 and is taken looking from the right-hand side of Fig. 1 and is on an enlarged scale;

Fig. 4 is a fragmentary detail end elevation of a portion of the head stock shown in Fig. 3 and is on a somewhat larger scale than in Fig. 3;

Fig. 5 is a view similar to Fig. 4, that is, it is an elevational view looking from the right toward Fig. 6, but showing certain parts in section, the section being taken along the line 5—5 of Fig. 6, looking in the direction of the arrows;

Fig. 6 is a horizontal sectional view taken substantially on line 6—6 of Fig. 5 looking in the direction of the arrows;

Fig. 7 is a fragmentary horizontal sectional view taken substantially on line 7—7 of Fig. 5 looking in the direction of the arrows;

Fig. 8 (Sheet 2) is a fragmentary detail sectional view of a portion of the machine illustrated in Fig. 3;

Fig. 9 (Sheet 2) is a detached bottom end view of a part of the portion of the machine shown in Fig. 8 with one of the parts thereof shown in section;

Fig. 10 (Sheet 2) is a sectional view taken substantially on line 10—10 of Fig. 8 looking in the direction of the arrows;

Fig. 11 (Sheet 4) is a transverse vertical section through the head stock of the lathe shown in Fig. 3 and is taken substantially on line 11—11 of Fig. 13 looking in the direction of the arrows;

Fig. 12 is a fragmentary vertical section taken substantially on line 12—12 of Fig. 13 looking in the direction of the arrows;

Fig. 13 (Sheet 5) is a horizontal irregular sectional view through the head stock and is taken substantially on line 13—13 of Fig. 11 looking in the direction of the arrows;

Fig. 14 is a fragmentary horizontal sectional view taken substantially on line 14—14 of Fig. 11 looking in the direction of the arrows, certain parts being shown in elevation;

Fig. 15 (Sheet 6) is a diagrammatic plan view of the change speed gears for the spindle drive in the head stock;

Fig. 16 (Sheet 7) is a horizontal sectional view similar to Fig. 6, but illustrating a different form of the invention from that shown in Fig. 6;

Fig. 17 is a vertical sectional view taken substantially on line 17—17 of Fig. 16 looking in the direction of the arrows;

Fig. 18 is a front elevation looking at the right of Fig. 16 and is similar to Fig. 4, but illustrates the form of the invention shown in Fig. 16;

Fig. 19 is a vertical sectional view taken substantially on line 19—19 of Fig. 16 looking in the direction of the arrows;

Fig. 20 (Sheet 6) is a detached developed view of a portion of the production log employed in the form of the invention illustrated in Figs. 16 to 19 inclusive;

Fig. 21 is a fragmentary front elevational view of a part of the head stock, with certain portions shown in section, and illustrates a modified form of construction from what has been previously illustrated;

Fig. 22 is a vertical sectional view taken substantially on line 22—22 of Fig. 21, looking in the direction of the arrows;

Fig. 23 is a view similar to Fig. 21 but illustrates another variation in the construction shown in said figure; and Fig. 24 is a fragmentary sectional view taken substantially on line 24—24 of Fig. 23, looking in the direction of the arrows.

It should be understood that, although the various embodiments of the invention illustrated herein are shown as applied to a turret lathe, the invention is applicable to other types of machine tools having one or more movable members to be operated at varying speeds and/or rates of feed.

The machine tool illustrated in the drawings is a turret lathe, as previously stated, and comprises a bed 35 provided in this instance with horizontal ways 36 upon which the turret slide or saddle 37 travels as does also the carriage 38 for the cross-slide which is mounted for sliding movement between the turret slide or saddle and the head stock 39 in which is rotatably arranged the work spindle 40 of the machine. The turret slide or carriage 37 is shown in the present illustration as carrying a hexagonal indexible turret 37a, while the cross-slide 38a on the cross-slide carriage 38 is illustrated as provided with an indexible square turret 38b. As is customary in machines of this type, the movements of the turret slide and of the cross-slide carriage along the ways 36 of the bed are imparted thereto by means of a feed shaft 41 which is operatively connected with the work spindle, wherefore the turret slide and cross-slide can be fed in direct relation to the speed of rotation of the work spindle, as will be well understood. The rate of feeding movement of the turret slide 37 and the cross-slide 38 can be varied by means of change speed gearing carried by the aprons 37b and 38c, respectively, such gearing being controlled by means of the customary control levers on the front of the aprons. The cross-slide carriage is provided with a manually indexible stop roll 42 carrying a plurality of adjustable abutment screws 42a which are adapted to abut with an adjustable stop rod 43 functioning in the customary manner.

So far, the description of the turret lathe disclosed herein has referred to conventional structure, and since it is well known in the art, it has been but briefly described. It will be understood that the work spindle 40 in the head stock 39 may be driven at different speeds of operation in the different operative steps of a complete operative cycle for the production of a work piece, and that suitable change speed gearing is arranged in the head stock for the purpose of imparting the various speed changes to the work spindle.

Preferably the prime mover for the machine is an electric motor 44 (see Fig. 1a) which is operatively connected to the machine by means of a suitable pulley 44a secured to the motor shaft, and a belt 44b extending around said pulley and around a pulley 45a fixed on a shaft 45 which is rotatably mounted in the head stock 39. Referring to Fig. 15 (Sheet 6 of the drawings), it will be seen that the shaft 45 is provided with two spaced clutch members 45b and 45c freely rotatable on the shaft, while a shiftable clutch member 45d is splined to the shaft to rotate therewith and slide thereon and is located intermediate the clutch members 45b and 45c, wherefore said clutch member 45d can be selectively moved into clutching engagement with the member 45b or the member 45c to cause said members to rotate with the shaft 45, or said shiftable member 45d can be moved to an intermediate position where it is disengaged from both of the previously mentioned clutch members. The clutch member 45b has formed thereon a gear 45e, while the clutch member 45c has formed thereon a gear 45f. The gear 45f constantly meshes with a gear 46a fixed to a shaft 46 rotatably mounted in suitable bearings in the head stock, wherefore when the shiftable clutch member 45d is engaged with the clutch member 45c the shaft 46 will be driven by the shaft 45 in a direction to impart forward rotation to the work spindle. The gear 45e constantly meshes with an idler gear 45g which, in turn, constantly meshes with a gear 46b fixed to the shaft 46, wherefore, when the shiftable clutch member 45d is engaged with the clutch member 45b, the shaft 46 will be rotated in a direction to impart reverse rotation to the work spindle 40.

Intermediate the gears 46a and 46b a three-step gear cone is mounted on the shaft 46 and is splined thereto so as to be shiftable axially thereof but to rotate therewith, said gear cone comprising the gears 46c, 46d and 46e. The gear 46c is adapted to be meshed with a gear 47a fixed to a shaft 47 rotatably mounted in the head stock, while the gears 46d and 46e are adapted respectively to be meshed with gears 47b and 47c also fixed to the shaft 47. It will be seen that through the gearing referred to the shaft 47 can be driven from the shafts 45 at any one of three different speeds and in opposite directions. The gear 47c constantly meshes with a gear 40a integrally formed on a sleeve 40b, which is freely rotatable between suitable shoulders on the work spindle 40. The gear 40a is adapted to be meshed with a gear 48a of a two-step gear cone which is splined to a shaft 48 to rotate therewith but to move endwise thereof, said two-step gear cone also having a gear 48b which is adapted to mesh with a gear 40c integrally formed on the sleeve 40b.

It will be seen that the shaft 48 through the gearing heretofore described can be driven by the shaft 45 at any one of said six different speeds and in opposite directions. The shaft 48 is also provided with a second two-step gear cone splined thereto to rotate therewith and move endwise thereof, which two-step gear cone comprises a gear 48c adapted to be meshed with a gear 40d fixed to the work spindle 40 and a gear 48d adapted to mesh with a gear 40e also fixed to the work spindle. It will be seen that the work spindle 40 through the gearing described can be driven by the shaft 45 in opposite directions and at any one of twelve different speeds. The work spindle 40 also has fixed thereto a gear 40f which through suitable gearing, not shown, drives the feed shaft 41 in timed relation therewith.

The shifting of the shiftable clutch member and the three- and two-step gear cones just above described is effected by means illustrated in Figs. 11 and 12 (Sheet 4) and Figs. 13 and 14 (Sheet 5) of the drawings.

The shifting of the gear cones is illustrated in this instance as being effected by means of a preselecting mechanism such as is shown in my issued Patent No. 2,068,552, but it should be understood that the invention, insofar as certain phases thereof are concerned, could be applied to machine tools employing the conventional selective gear shift.

The shiftable clutch member 45d is moved by means of a fork 49a engaging a groove in the member and integrally formed as a part of a sleeve 49 slidably carried by a rod 49b supported in suitable brackets in the head stock 39. The slide 49 is provided with two upstanding spaced lugs, see Fig. 13, between which operates the rounded end of a lever 50a secured to the lower end of a vertically extending shaft 50 which is rotatably mounted in the cover 39a and extends upwardly beyond the upper side thereof and is provided with an enlarged portion. The main control lever 51 for the work spindle 40 is pivotally connected to said enlarged portion of the shaft 50, wherefore when said lever is rocked horizontally the shiftable clutch member 45d can be moved into either of its two operative positions or into its inoperative position. The main control lever 51 may also be rocked on its pivot in a vertical plane for a reason later to be explained and in a manner such as is shown in my above mentioned issued Patent No. 2,068,552. The three-step gear cone on the shaft 46 is shifted to any one of its three operative positions by means of a fork 52a straddling the gear 46d and integrally formed on a sleeve 52 which is slidably supported on the shaft 45h upon which the idler gear 45g is mounted (see Fig. 11). The sleeve 52 is provided with an upwardly and laterally extending arm 52b having at its end a forked portion in which operates the end of a lever 53a fixed to the lower end of a vertically extending shaft 53 mounted for rocking movement in the cover 39a of the head stock 39. The rear two-step gear cone on the shaft 48 is shifted to either one of its two operative positions by means of a shoe 54a straddling the large gear 48b of the gear cone and pivotally carried by the end of a lever 54 mounted on the shaft 53 above the lever 53a for free rocking movement thereon. The front two-step gear cone on the shaft 48 is shifted to either one of its two operative positions by means of a shoe 55a carried by the end of a lever 55b fixed to the lower end of a rockable shaft 55 carried by the cover 39a, see Fig. 12. The usual spring detents are provided for holding the levers 53a, 54, and 55b in the positions to which they have been moved.

The shaft 55 adjacent its upper end is provided with a lever 55c fixed thereto and pivotally connected at its outer end to one end of a link 55d, the opposite end of which is pivotally connected to an angular lever 55e which has its other end mounted on the shaft 53 for free rocking movement thereon. A lever arm 53b is fixedly mounted on the shaft 53 below the lever 55e for rocking movement with said shaft. The lever 53b is provided with a horizontally extending pin or finger 53c while the levers 54 and 55e are provided with vertically extending pins or fingers 54b and 55f, respectively, it being noted that pins 53c, 54b, and 55f are equally spaced radially of a common center which is the shaft 56 that extends horizontally in the cover 39a of the head stock and is mounted for rotatable movement therein. Two endwise shiftable spools 56a and 56b are splined on the shaft 56 so as to rotate therewith but move endwise thereon, which spools on their adjacent faces are provided with cooperating pairs of long and short projections and projections of equal lengths, as fully explained in my said Patent No. 2,068,552.

As explained in the said patent, the spools are provided with thirty-nine cooperating pairs of projections arranged in three series of thirteen pairs each, twelve of the pairs in each series representing the twelve different spindle speeds effected by the shifting of the gear cones previously referred to, while the thirteenth pair in each series represents a neutral position of the spindle for purposes of loading and unloading the work piece, at which time the spindle is disconnected from its driving gear train.

In view of the explanation in my said patent, it will be understood that the pins 53c, 54b, and 55f are located between the spools, and when the spools are moved endwise toward each other they are engaged or positioned by the cooperating projections to effect a movement of the levers carrying the pins and a consequent shifting of the gear cones in the head. It will be understood that the movement of the pin 53c by the projections rocks the lever 53b and the shaft 53 to rock the lever 53a and effect a shifting of the three-step gear cone. The movement of the pin 54b by the projections on the spools effects a movement of the lever 54 and a direct shifting of the rear two-step gear cone. The movement of the pin 55f by the projections on the spools results in a movement of the lever 55e and through the link 55d a movement of the lever 55c, shaft 55, and lever 55b to effect a shifting of the front two-step gear cone to either of its two operative positions or to a position wherein it is disconnected from the work spindle. The spool 56a is moved endwise on the shaft 56 by means of a fork 57a engaging in a groove in the spool and integrally formed on a sleeve 57b, which is slidably mounted on a rod 57 fixed in the cover 39a of the head stock and located at one side and above the shaft 56. The spool 56b is moved endwise on the shaft 56 by a similar fork 58a integrally formed on a sleeve 58b which is slidably mounted on a rod 58 parallel to the rod 57 and in horizontal alignment therewith but arranged on the opposite side and above the shaft 56. The sleeves 57b and 58b are moved in unison equal distances in opposite directions upon the rods 57 and 58 to cause endwise movement of the spools away from each other or toward each other by means of an equalizer bar 59a carrying at its opposite ends shoes which work between upstanding spaced lugs on the sleeves 57b and 58b, which equalizer bar 59a is integrally formed on the lower end of a rockable shaft 59 that is carried in the cover 39a of the head stock and extends upwardly above the same.

A block 59b is secured to the upper end of the shaft 59 and has an arm 59c extending forwardly therefrom, as viewed in Fig. 11, and to which is pivotally connected a lengthwise adjustable two-part link 60 the opposite end of said link being pivotally connected to an upward extension on the lever bracket 51a which is pivotally connected to the shaft 50 and has the main control lever 51 extending forwardly therefrom. It will be seen that movement of the main control lever 51 in a vertical plane rocks the bracket 51a about its pivot in a vertical plane and acts through the link 60 connected to the bracket to rock the arms 59c and the block 59b and the shaft 59 to cause the spools 56a and 56b to move endwise toward or away from each other equal distances, it being remembered that when the lever 51 is moved in a horizontal plane a shifting of the clutch member 45d takes place, but it should be noted that said movement of the lever 51 in a horizontal plane does not affect or operate the spools 56a and 56b while the movement of the lever 51 in a vertical plane to move the spools endwise does not affect the shiftable clutch member 45d, as fully explained in my said Patent No. 2,068,552.

The shaft 56 is rotatable in opposite directions to index the spools to bring the various pairs of cooperating projections thereon into alignment with the pins 53c, 54b, and 55f, so that when the spools are moved endwise toward each other certain or all of said pins will be shifted thereby to effect a shifting of one or more or the gear cones to produce different and predetermined speed changes in the operation of the spindle, the direction of shifting of said pins depending upon whether or not the cooperating pairs of projections are long and short, short and long, or of equal length, as fully explained in my said Patent No. 2,068,552.

The shaft 56 extends beyond the end of the head and has secured thereto a dial 62 and an operating knob 62a, wherefore the shaft 56 and spools 56a and 56b can be indexed in opposite directions to bring the various pairs of cooperating projections on the spools into operative position with respect to the pins 53c, 54b, and 55f for preselecting the different spindle speeds. The face of the dial 62 is provided with suitable indicia representing the various spindle speeds and neutral or loading and unloading position of the spindle, which indicia can be selectively brought into alignment with a fixed pointer 62b to indicate when the spools have been indexed to the proper position and the desired spindle speed preselected.

Referring to Figs. 3, 5, 6, and 7, it will be seen that the cover 39a of the head stock is provided with suitable bearing brackets which rotatably support a shaft 63 that extends horizontally of the head from the front side thereof toward the rear side and is provided at its end at the front of the machine with a square portion 63a, see Fig. 6. A removable box 64 is secured to the cover 39a at the front of the machine and carries an integral bearing boss formed on a horizontal partition 64a, see Fig. 5, which boss rotatably supports a shaft 65 extending horizontally of the box 64 and axially aligned with the shaft 63, said shaft 65 being provided at its inner end with a squared socket 65a fitting the squared end 63a of the shaft 63 and at its outer end beyond the box 64 with an operating knob 65b. The shaft 65 is further provided intermediate the squared socket 65a and the bearing boss with a spiral gear 65c and adjacent the opposite end of the bearing boss with a beveled pinion 65d. The spiral gear 65c meshes with a spiral gear 66a fixed on the lower end of a vertically extending shaft 66 in the box 64 while the beveled pinion 65d meshes with a beveled pinion 67a fixed on the lower end of another vertically extending shaft 67 likewise arranged in the box 64 and parallel to the shaft 66.

It will be seen that when the shaft 65 is rotated either by the knob 65b or through the shaft 63, as will later be explained, the vertically extending shafts 66 and 67 are rotated in the same direction, and they are both driven from the shaft 65 with a one-to-one ratio at the same speeds. The shafts 66 and 67 are adapted to receive flanged drums 68, the lower ends of said drums overhanging the bearing bosses for the shafts 66 and 67, while the upper ends thereof are operatively connected to the shafts by means of washers 68a having squared openings fitting squared portions of the shafts and operatively connected to the drums by pins 68b carried by the washers and adapted to be selectively inserted in a series of openings formed in the flanges at the upper ends of the drums, see Figs. 5 and 6.

The box 64 is provided with a removable cover 64b having on its under side bearing bosses to receive the upper ends of the shafts 66 and 67 and being located and held in place by pins mounted in the cover and adapted to engage openings 64c in the box. The drums 68 are adapted to have placed thereon a strip 69 of flexible material having stamped on one face thereof spaced production logs for the different operative steps in a complete work cycle for the production of a work piece, one of said production logs being illustrated in alignment with the window 64d in the box 64, see Fig. 4. A substantially L-shaped backing plate 64e is arranged in the box adjacent the window to position and guide the strip 69. It will be seen that the cover 64b of the box can be removed and the drums 68 with the strip 69 thereon positioned upon the shafts 66 and 67 with the production log for the first operative step of the complete cycle in alignment with the window 64d, after which the washers 68a can be positioned upon the squared portions of the shafts and operatively connected to the drums by the pins 68b and then the cover 64b can be again mounted and located upon the top of the box 64.

The dial having been set at neutral, i. e., the spindle disconnected from its drive, and a new work piece having been mounted on the work spindle, the operator now refers to the production log to obtain the R. P. M. for the work spindle for the first work operation in the complete cycle, after which he raises the main control lever 51 to move the preselecting spools 56a and 56b endwise away from each other, following which he turns the dial 62 to bring the number representing the R. P. M. for the work spindle in the first operative step in line with the fixed pointer 62b, and reference to Fig. 4 will show that the operator has shifted the dial in the present instance to bring the number 198 in line with the pointer in accordance with the production log.

The operator now moves the main control lever downwardly to bring the spools 56a and 56b inwardly toward each other to effect a shifting of the gear cones to obtain the spindle speed of 198 R. P. M. for the first operation, and he then moves the control lever horizontally from neutral position into forward position to engage the clutch and connect the spindle drive with the shaft 45 to start the rotation of the work spindle, after which he elevates the control lever to again move the spools endwise away from each other, it being remembered that the gear cones will be held in their shifted position by the spring points previously referred to.

The work spindle now being rotated at the desired R. P. M. for the first operation, the operator will obtain from the production log information relative to the cutting operations to be performed and the tools on the various faces of the turrets to be used during the first operative step, such information in this instance showing the operation to include "rough turn", "bore", "face", and "chamfer", as shown on the lower part of the log illustrated in Fig. 4, these operations requiring the use of the tools on face #1 of the hexagon turret, faces #1 and #3 on the square turret, and the employment of square turret stop #1 as shown on the log. The log also shows that the hexagon turret will have a feed of .027 inch per revolution of the work spindle, while the square turret will have a feed for face #1 of .039 inch per revolution, and for face #3 of .012 inch per revolution of the work spindle.

The operator now shifts the levers on the aprons 37b and 38c to obtain the feeds required for the turret slide and the cross slide carriage as specified above and sets the stop roll 42 to align stop #1 with the stop rod 43, after which the machine is placed in operation for the performance of the first step in the complete operative cycle.

While the machine is operating during the first step the operator again refers to the log and obtains the information for the presetting of the R. P. M. of the work spindle for the next operative step in the cycle, which information is indicated on the log in the upper right-hand corner as 81 R. P. M., as shown in Fig. 4. It will be remembered that the operator, following the horizontal movement of the control lever to engage the main clutch for the forward drive of the work spindle, raised said lever to move the spools 56a and 56b outwardly, wherefore it is only necessary that he now turn the dial 62 to bring the numeral 81 in line with the fixed pointer 62b to preselect or preset the spools, so that, when they are again moved inwardly toward each other at the end of the first operative step in the cycle, they will effect a shifting of the gear cones to obtain the required spindle speed of 81 R. P. M. for the next operative step in the cycle.

Although the log strip 69 might be shifted manually by rotating the knob 65b on the shaft 65 just prior to the completion of each operative step in the complete cycle to bring the log for the next operative step into line with the window 64d in the box 64, it is preferred to obtain the shifting of the log strip automatically by a mechanism now to be described.

Referring to Fig. 3, it will be seen that the shaft 63 at its rear end has fixed thereto a beveled gear 63b, which meshes with a beveled gear 70a fixed on the upper end of a vertically extending shaft 70 rotatably supported in the head stock and extending outwardly of the rear under side of the head stock through a suitable boss formed on the head stock. The lower end of the shaft 70 is rotatably supported in an elongated sleeve 70b pressed into the opening in the boss, see Fig. 8, and rotatably supporting between a shoulder formed at the outer end of the sleeve and a shoulder formed by the boss a gear 71 having a head 71a which carries in a suitable slot formed in the head a pivoted spring-pressed pawl 71b adapted to engage in a cutaway portion 70c in the shaft 70 and forming a tooth therein, wherefore it will be seen that when the gear 71 rotates in one direction it will be operatively connected to the shaft 70, while when it rotates in the opposite direction it will merely idle on the sleeve 70b and does not rotate the shaft 70.

The boss which supports the shaft 70 has bolted thereto on its under side an elongated L-shaped supporting or guiding member 72 which supports a rack 73 that meshes with the gear 71. The rack 73 has threadedly connected to one of its ends a rod 73a which extends through an opening in a plate 72a secured to the end of the member 72 and carries between said plate and the head at the end of the rod a compression spring 73b acting at all times to urge the rack 73 in a direction to hold its end in abutting relation with the plate 72a. The opposite end of the rack 73 has secured thereto a rod 73c which extends along the rear side of the bed 35 and above and parallel to the rear way 26 and passes through an opening formed in a lug 73c on the rear side of the turret slide 37. The outer end of the rod 73c is provided with an abutting collar 73d. The rod 73c is of such length that just prior to the turret slide 37 reaching its most rearward position at the end of each operative step in the complete work cycle, the lug 37c abuts the collar 73d during the remainder of the rearward movement of the turret slide and endwise movement is imparted to the rack 73 against the action of the compression spring 73b, the position of the abutting collar 73d of the rod 73c after it has been moved by the lug 37c being indicated in dotted lines in Fig. 2.

It will be seen that the movement of the rack, as just described, causes a rotation of the gear 71 through slightly more than a complete revolution and in a direction such that the gear and the shaft 70 are operatively connected through the pawl 71b, and the shaft 70 is given a complete revolution by the moving pawl, and since the shaft 70 is connected through the gearing and shafts previously described to the strip drums 68 with a one-to-one ratio, said drums will be given a complete revolution to shift the log strip and to bring the log for the next operative step in the cycle into alignment with the window 64d in the box 64.

After the turret slide reaches its most rearward position, it is automatically disconnected from its drive, as will be well understood, and, in order to start the second operative step in the cycle, the operator moves the main control lever while still in its elevated position, as will be remembered, horizontally to disengage the main clutch in the spindle drive, and he continues to move said lever in a downward direction to bring the preselecting spools inwardly toward each other to effect a shifting of the gear cones to obtain the preselected speed for the work spindle in the next operation. After these steps have been accomplished, the operator may again move the control lever horizontally to reengage the main clutch and to start the rotation of the spindle at the new preselected and desired speed for the next operation, whereupon he immediately raises the control lever to bring the spools outwardly so that he can index the same when desired to preselect the new spindle speed for the next successive operative step, which spindle speed will be shown on the newly positioned log, as explained above. The operator obtains the other necessary information from the newly positioned log and continues to operate the machine as specified in the description given above for the first operative step. It will be understood that this procedure is followed through each of the operative steps in the complete cycle, and, as is well understood in the art, the production of different kinds of work pieces may require various numbers of operative steps for the complete cycle and hence there will be as many production logs on the strip 69 as there are operative steps required in the complete cycle for particular work pieces. The strip 69 following the production log for the last operative step in the cycle is provided with the word "neutral", indicating the completion of the cycle and that the work piece must be removed and a new one mounted on the spindle and the log strip rewound in the reverse direction by the knob 65b to bring the log for operative step #1 into view.

Of course when the turret slide moves toward the head stock as the next operative step in the cycle commences, the rod 73c and rack 73 move under the action of the compression spring 73b until the rack 73 abuts the plate 72a carried by the member 72. As the rack 73 moves toward abutting position with the plate 72a, the gear 71 will be rotated in the opposite direction from that previously referred to while the pawl 71b will ride idly around the shaft 70 slightly more than one revolution of the gear, wherefore the pawl will come to rest in the cutaway portion of the shaft 70 forming the tooth and will be in a position to engage with the tooth when the rack and gear are moved in the opposite direction.

It will be understood that no movement is imparted to the shaft 70 and through the associated gearing and shaft to the drums 68 carrying the strip 69 during the time that the turret slide is moving toward the head.

In Figs. 16 to 20 inclusive there is disclosed a different form wherein the log strip is only manually moved to position the different logs for the various operative steps in the cycle in line with the window, which positioning of the logs automatically indexes the preselecting spools to the correct position for effecting shifting of the gear cones to change the speed of the work spindle. A box 74 is bolted to the front side of the cover 39b of the head and adjacent one end is provided with a pair of horizontal vertically spaced shafts 75 and 76 rotatably supported in bearing bosses formed in a partition 74a of the box 74 and in a plate 74b removably secured to a lateral extension lug 74c formed on the partition 74a, see Fig. 19. The upper shaft 75 is extended beyond the plate 74b and outwardly through an opening in a hinged cover plate 74d on the box 74 and has fixed thereto an operating knob 75a. The shafts 75 and 76 are provided at their inner ends with similar spur gears 75b and 76b which intermesh with a similar spur gear 77a fixed on a shaft 77 that is rotatably mounted in the cover 39b of the head stock and extends horizontally therein at right angles to the shaft 56 which supports the preselecting spools 56a and 56b previously referred to. The shaft 77 has on its inner end a spiral gear 77b which meshes with a similar spiral gear 56c on the shaft 56. The shafts 56, 77, 75, and 76 are interconnected by the gearing referred to so as to rotate with a one-to-one ratio, and hence it will be seen that one turn of the knob 75a will produce one turn of the shaft 56 and the spools 56a and 56b carried thereby. The shafts 75 and 76 have fixed thereto, respectively, drums 75c and 76c with the drum 75c provided adjacent one end thereof with four equally spaced radially extending projections 75d, and, as clearly shown in Fig. 17, three of these projections are relatively small as compared with the fourth projection. An endless log bearing strip 78 later to be described in detail extends around the drums 75c and 76c and an idler drum 79 mounted for free rotation on a sleeve 79a carried by a stub shaft 79b which extends through an elongated slot 74e in the rear of the box 74 and can be clamped in various positions of adjustment in said slot by means of a shouldered block at one end and a nut and washer at the other end, as clearly shown in Fig. 16. The endless log strip 78 will vary in length according to the number of operative steps in the complete work cycle for the production of a work piece, and such variation in the length of the log strip can be compensated for by suitably adjusting the position of the stub shaft 79b with respect to the shafts 75 and 76 or by some other similar adjusting means.

Referring to Fig. 20, Sheet 6, it will be seen that the endless log strip 78 is provided adjacent one of its edges with a series of equally spaced openings 78a, and that every fourth opening in the series is substantially larger than the other openings. When the strip 78 is arranged on the drums 75c, 76c, and 79, as previously referred to, the projections 75d on the drum 75c engage the opening 78 on the strip with the three small projections engaging in the similar openings in the series while the fourth and larger projection on the drum engages in the larger openings in the series, from which it will be seen that the distance between adjacent large openings 78a of the strip 78 is equal to the circumference of the drum 75c, and hence, since the spools 56a and 56b make one revolution, as previously explained, for each revolution of the drums, it will be seen that the spaces on the strip 78 between the large openings are subdivided into twelve equal subdivisions representing the groups of projections on the spools while the spaces in line with the large openings represent the projections on the spools for neutral wherein the work spindle is disconnected from its drive for purposes of loading and unloading a work piece.

Logs 78b are stamped or otherwise arranged on the strip 78 in accordance with the different operative steps in the complete cycle, and each log is so located that a centrally disposed double ended arrow thereon will have its right end, as viewed in the drawings, aligned with the subdivision on the strip representing the required spindle speed for that particular operative step, wherefore, when the log for a particular operative step is positioned in line with the window 74f of the box 74 and with the left end of the arrow, as viewed in Fig. 18, in line with the fixed pointer 74a and bearing the letter "S" representing the word "standard", the spools 56a and 56b will be indexed to the proper position so that when they are brought inwardly toward each other they will effect a shifting of the gear cones to produce the desired speed for the work spindle, as, for example, in log #1 as shown in Figs. 18 and 20 the spools will effect a change in the spindle speed to 151 R. P. M.

The second log (log #2) is positioned in this instance with the right-hand end of its double-ended arrow in alignment with the subdivision representing 81 R. P. M. of the work spindle and located between the next pair of adjacent large openings 78a, and, therefore, when the drums and spool are turned by the operating knob until log #2 is in line with window 64f and the left-hand end of the arrow on the log registers with the fixed pointer 74g, the spools 56a and 56b will have been indexed so as to effect a change in speed of the work spindle from 151 R. P. M. to 81 R. P. M. in this particular instance. Each log on the strip 78 will bear information similar to that explained in connection with the log on the strip 69 previously referred to and will enable the operator to operate the machine efficiently. It will be understood that the operator, after he has obtained the desired information from the log for one step, can move the log strip to bring the log for the next step into line with the window and to index the spools 56a and 56b to preset or preselect the spindle speed for the next operation in the cycle and during the previous operation therein. If desired, however, the operator can wait until the first or preceding operative step has been completed and can then shift the log strip 78 to bring the log for the following operative step into position with the window and immediately start the operation of the machine for said next operative step, but when this is done there is no preselecting of the spindle speeds but merely a selecting thereof since the changing or shifting of the gear cones immediately follows the indexing of the spools. The log strip 78 following the log for the last operative step in the cycle is provided with an arrow and the word "Neutral", and during the last operative step the operator presets the machine for "Neutral" with the arrow in line with the pointer 74g for the purpose of stopping the spindle and unloading the finished work piece.

When, under certain conditions, it is desired to slightly increase the cutting speed for the tools in any of the operative steps in order to step up the rate of production or to decrease such cutting rate when, for example, the hardness or other characteristics of the material being worked on requires a somewhat lower cutting speed than the designated one, the operator may be instructed to position the logs so that the right-hand end of the double-ended arrow thereon aligns with a fixed pointer 74h representing an increase over the normal cutting speed, or with a fixed pointer 74i representing a decrease from the normal cutting speed at which time the left-hand end of the arrow will not be in alignment with the pointer 74g representing the standard cutting speed, it being remembered that the speeds indicated on the strip 78, Fig. 20, are substantially in geometric progression, wherefore the positioning of the arrow in line with the pointers representing the increased or decreased speeds corresponds to positioning the log and, therefore, the spools for the next higher or next lower speed on the strip. At the end of the cycle, the arrow at the word "Neutral" must be positioned, however, in line with the pointer 74g to disconnect the spindle drive for the purpose of unloading and loading.

It will be noted that in the embodiment just described no dial similar to dial 62 indicating the spindle speeds is necessary, and it will be understood that the main control lever 51 is operated and the turret slide and cross slide and stops adjusted and controlled during the operation of the machine for the different operative steps in a manner corresponding to the operation thereof, as described with respect to the first explained form of the invention.

In Figs. 21 and 22 there is disclosed a two-part dial which is mounted on the shaft 56 and comprises a dial disk 80 fixed to the shaft and having a skirt-like portion 80a extending toward the right, as viewed in the drawings, and keyed to the shaft 56. The disk 80 is provided adjacent its circumference with a plurality of circumferentially spaced openings 80b adapted to have removably fitted therein shouldered pins 80c. The outer dial part is a cup-shaped member 81 having a centrally disposed sleeve-like portion 81a which is slidably mounted on the skirt-like portion 80a of the dial disk 80 and is splined thereto so that the disk 80 and the member 81 will rotate together. The circumference of the member 81 is provided with suitable indicia indicating in this instance the spindle speeds for a two-speed motor having high and low speed ranges.

The shaft 56 is extended through the plate 80 and the member 81 and outwardly of the latter where it has a reduced threaded portion adapted to receive a clamping and operating knob 82 which acts, when screwed upon the reduced portion of the shaft, to hold the member 81 in assembled relation with the disk 80. The knob 82 may be provided, and is so illustrated, with a conventional lock indicated at 82a wherein the lock pin when turned to locking position engages in a groove formed in the end of the reduced portion of the shaft 56 to prevent the unscrewing of the knob 82 from the shaft for reasons later to be explained.

Clips 83 formed in this instance of spring steel and having on one end a hooked portion which can be positioned over the periphery of the dial and will engage an annular groove formed on the rear face of the dial, as shown in Fig. 21, are mounted on the member 81 to indicate the spindle speeds for the different operative steps for the cycle. In positioning the clips upon the member 81, the latter is moved away from the disk 80 by unscrewing the knob 82 after the lock bolt of the lock 82a has been unlocked, and the clips are then positioned upon the member according to the desired spindle speeds for the different operative steps. While the member 81 is still in the position to which it has been moved outwardly away from the disk 80, pairs of pins 80c are inserted in the openings 80b of the disk 80 in such positions that, when the member 81 is moved toward the disk to its fully assembled relationship therewith, the curved portions of the clips will lie between the pins of each pair, and hence when the knob 82 has been screwed onto the shaft 56 and locked thereon the clips cannot be shifted circumferentially of the member 81 and cannot be removed due to the small clearance between the disk 80 and the member 81 and hence are locked in place against unauthorized change by the operator.

It will be seen that the machine can be set up for production purposes to operate at specified spindle speeds in the different operative steps and that the operator cannot make any unauthorized changes in the spindle speeds for the different steps in the operation. If the operator should position the dial so as to operate the machine contrary to the spindle speeds provided for by the location of the clips, this fact will be readily discernible to an inspector or foreman or other person in authority.

The two sets of indicia on the member 81 are arranged with the spindle speeds for the high speed operation of the motor and with the spindle speeds for the low speed operation of the motor for the same dial setting, so that the clips 83 can be positioned at one side or the other of the dividing line between the numbers of each pair to show if the motor is to operate at high speed or low speed. In case two of the operative steps in the cycle should require the same spindle speed, as, for example, operative steps #2 and #4 as shown in Fig. 21, two of the clips are mounted on the member 81 adjacent the pair of numbers representing the required spindle speed, and in this instance the pins 80c are spaced on opposite sides of the two clips, it being noted that the holes 80b in the disk 80 are so laid out that any particular requirement of spacing of the pins can be taken care of. It will be understood that the operator turns the dial for presetting purposes until the division line between the numbers of each pair of numbers is in alignment with a pointer 84 mounted on the front side of the cover 39d of the head stock.

In Figs. 23 and 24 the dial 85 fixed on the shaft 56 is provided on its periphery and adjacent its front face with a series of numbers indicating the spindle speeds for both the high and low speed operation of the motor. It is proposed to secure to the periphery of the dial 85 to the left of the series of numbers just referred to a strip 85a upon which the operator, as he sets up the machine and tries the operation thereof upon a trial work piece, can make informative notations showing the various stops, feeds, and other adjustments to be employed with the various spindle speeds in the different operative steps of the complete cycle, and in this way there is made up on the strip 85a the information for a complete production log which the operator can subsequently follow or from which dial settings or log strips in the other forms of the invention previously explained can be developed. The strips 85a is held in position on the dial by locating the opposite ends of the strip beneath a clamping plate 85b arranged at the neutral position of the dial and held in clamping engagement with the ends of the strip by screws 85c extending into the dial, as clearly shown in Fig. 24.

The production logs in the forms of the invention shown in Figs. 21 to 24 inclusive embody the dial and the indicia thereon, together with the clips and the strips secured to the dial, while in the form of the invention shown in Figs. 1 to 20 inclusive the production logs are on the movable log strips carried by drums.

It will be understood that the invention in all or some of its forms can be utilized on machines not employing any preselecting speed changing devices but having conventional speed changing means, such as step-by-step speed changing mechanism or variable speed hydraulic or electric motors, variable friction or belt drives, or any other similar drives wherein the speeds can be varied by a step-by-step or by a constant or gradual acceleration or deceleration between minimum and maximum.

It will be seen that by means of the invention herein described there is incorporated into the machine as a part thereof means to visually indicate to the operator the information necessary to enable him to operate the machine for the different steps of the complete cycle for the production of a work piece without referring to the usual lengthy and separate instruction sheet or drawing, thus increasing the operating efficiency of the machine. The operator, in operating a machine embodying the present invention, does not have to select from a mass of other information upon an instruction sheet the particular spindle speeds and the settings of other parts of the machine for each operative step in the complete cycle since the information required for each operative step is arranged in segregated form and visibly shown on a movable member which is operatively connected to a movable part of the machine and controls the setting of said part to bring about the required changes in the operation thereof for the different operative steps which member necessarily is in a position so as to be under the constant observation of the operator and his supervisor.

The present invention enables the machine to be operated with a minimum reliance on the operator's memory and care in selecting from an instruction sheet the proper data for the different operative steps, inasmuch as the operator merely moves the movable member in the sequence indicated thereon and corresponding to the different operative steps in the cycle.

Although various forms, modifications, and adaptations of the invention have been illustrated herein, it should be understood that the invention is not to be limited thereto since it may be susceptible of various modifications and adaptations within the scope of the appended claims.

Having thus described my invention, I claim:

1. In a machine tool having a movable part, means for changing the rate of movement of said part, means operable in one operative step of the machine while said part is moving at one rate of movement for preselecting the rate of movement of said part for the following operative step of the machine, and relatively movable means operatively connected with said preselecting means for indicating to the operator during one operative step the rate of movement to be preselected for said part for the following operative step in a complete work cycle.

2. In a machine tool having a part to be moved at varying rates of movement in the different operative steps of a complete work cycle, means for selecting the rate of movement of said part, and relatively movable means operatively connected with said selecting means for actuating the same, and having production logs arranged thereon in spaced relation and visually indicating the sequential operative steps of said complete work cycle.

3. In a machine tool having a part which is to be moved at different rates of movement in the different operative steps of a complete work cycle, means for preselecting during one operative step the rate of movement for said part for the following operative step, and relatively movable means operatively connected with said preselecting means for actuating the same and having arranged thereon spaced production logs for visually indicating the sequential operative steps of said complete cycle.

4. In a machine tool having a part to be moved at different rates in the different operative steps of a complete work cycle, means for selecting the different rates of movement of said part, and relatively movable means operatively connected with said selecting means for actuating the same and including a movable strip having production logs arranged thereon in spaced relation and visually indicating the sequential operative steps of said complete cycle.

5. In a machine tool having a part to be moved at different rates of movement in the different operative steps of a complete work cycle, means for selecting the different rates of movement of said part, a drum operatively connected with said selecting means for actuating the same, spaced production logs associated with said drum and correlated to the different operative steps of the complete work cycle, and a fixed pointer cooperating with said production logs whereby when said drum is rotated to move a certain production log into registration with said pointer said selecting means is actuated to select the proper rate of movement for said part for a particular operative step.

6. In a machine tool having a part to be moved at different rates of movement during the different operative steps in a complete work cycle, means for selecting the different rates of movement for said part, and means for actuating said selecting means and including a rotatable drum operatively connected with said selecting means and having associated therewith spaced production logs related to the different operative steps of the cycle, a pointer cooperating with said production logs whereby when said drum is rotated to register said production logs with said pointer said selecting means is actuated to select a certain rate of movement for said part, and a second pointer cooperating with said production logs so that when said production logs register therewith said selecting means is actuated to select a rate of movement for said part other than the rate of movement normally employed during the particular operative step and indicated by the first named pointer.

7. In a machine tool having a part to be moved at different rates of movement for the different operative steps in a complete work cycle, means for selecting the different rates of movement for said part, and means for actuating said selecting means and for indicating the desired actuation thereof comprising a rotatable drum operatively connected with said selecting means and having associated therewith spaced production logs related to the different operative steps of the cycle, means for locating the different production logs to select the predetermined and normal rates of movement of said part for the different operative steps, and means for locating said production logs to select rates of movement for said part for the different operative steps other than the normal rates of movement thereof.

8. In a machine tool having a part to be moved at different rates of movement during the different operative steps of a complete work cycle, means for selecting the rates of movement of said part, and means for actuating said selecting means and having a series of production logs associated therewith and correlated to the different operative steps, means cooperating with said production logs indicating the selection of the different normal rates of movement for said operative steps or for indicating the selection of rates of movement differing slightly from the normal rates of movement.

9. In a machine tool having a part to be moved at different rates of movement during the different operative steps of a complete work cycle, means for selecting the different rates of movement of said part and means forming a production log and operatively connected with said selecting means for actuating the same and comprising relatively rotatable members, and adjustable means associated with one of said members for visually indicating the sequential operative steps of said complete cycle.

10. In a machine tool having a part to be moved at different rates of movement during the different operative steps of a complete work cycle, means for selecting the different rates of movement of said part and including a rotatable dial comprising two relatively movable members, one of which is provided with indicia indicating the different rates of movement of said part, adjustable means associated with said members and indicating the different operative steps in the work cycle, and means for locking said members against relative movement and for retaining said adjustable means in adjusted position.

11. In a machine tool having a part to be moved at different rates of movement in the different operative steps of a complete work cycle, means for selecting the different rates of movement of said part and including a rotatable shaft, a dial mounted on said shaft and formed of two axially separable members, one of said members being provided with a series of circumferentially spaced openings, clips bearing numbers representing the different operative steps in the cycle adjustably associated with the other of said members, pins carried by the first named member and adapted to be inserted in certain of the openings therein so as to lie on opposite sides of said clips, and a tumbler lock for locking said members in assembled position and said clips in adjusted position.

12. In a machine tool having a part to be moved at different rates of movement in the different operative steps of a complete work cycle, means for selecting the different rates of movement of said part and including a rotatable shaft, a dial mounted on said shaft and formed of two axially separable members, one of said members being provided with a series of circumferentially spaced openings, clips bearing numbers representing the different operative steps in the cycle adjustably associated with the other of said members, pins carried by the first named member and adapted to be inserted in certain of the openings therein so as to lie on opposite sides of said clips, and means for maintaining said members in assembled position and said clips in adjusted position.

13. In a machine tool having a part to be moved at different rates of movement in the different operative steps of a complete work cycle, means for selecting the different rates of movement of said part and including relatively rotatable members one of which is provided with indicia for indicating the different rates of movement of said part, and a production log in the form of a detachable strip carried by said last named member.

MAX E. LANGE.